UNITED STATES PATENT OFFICE.

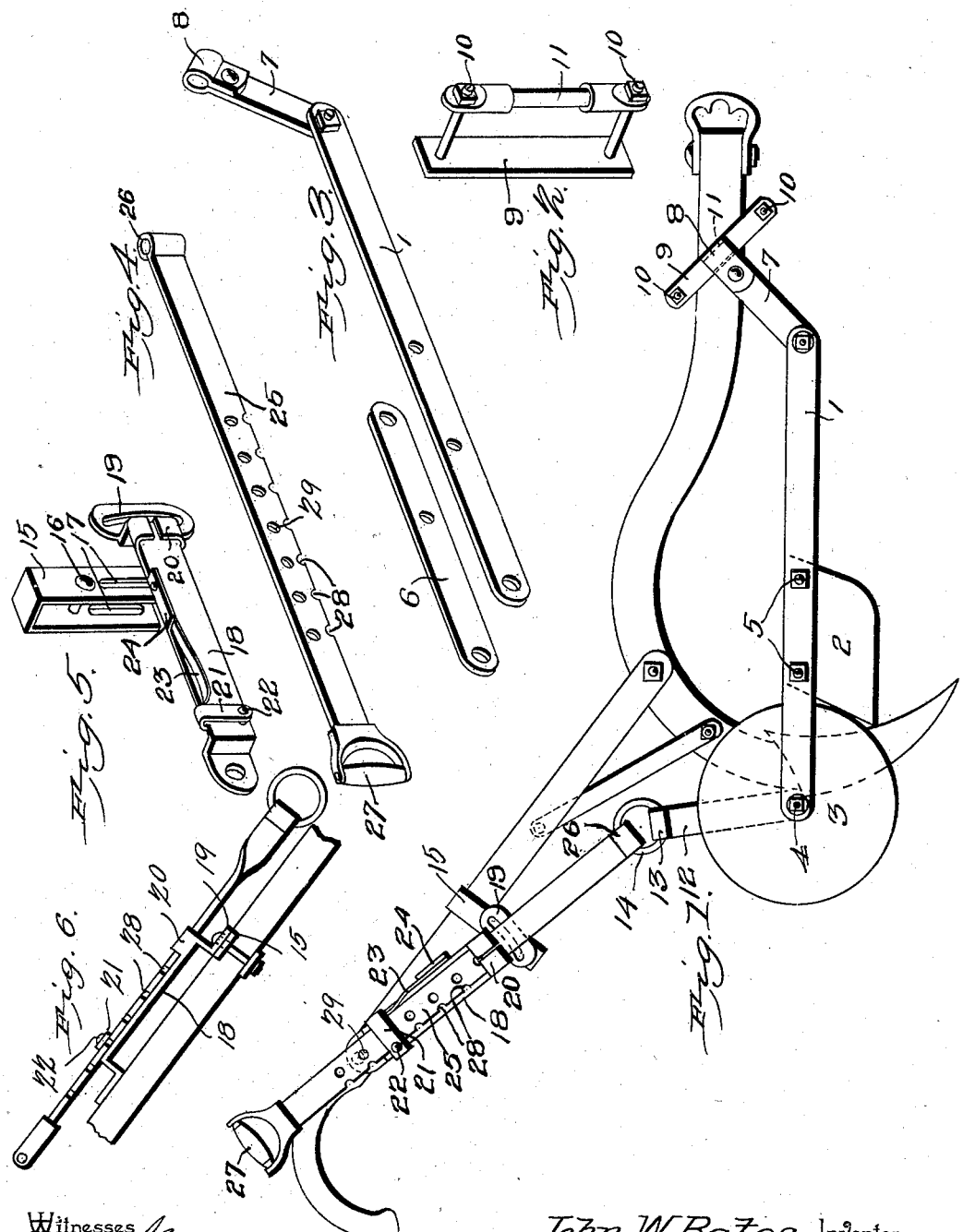

JOHN W. BATES, OF HALEYSVILLE, ALABAMA.

FENDER ATTACHMENT FOR CULTIVATOR-PLOWS.

SPECIFICATION forming part of Letters Patent No. 698,624, dated April 29, 1902.

Application filed February 19, 1902. Serial No. 94,820. (No model.)

*To all whom it may concern:*

Be it known that I, JOHN W. BATES, a citizen of the United States, residing at Haleysville, in the county of Winston and State of Alabama, have invented a new and useful Fender Attachment for Cultivator-Plows, of which the following is a specification.

My invention is an improved fender attachment for cultivator-plows; and it consists in the peculiar construction and combination of devices hereinafter fully set forth and claimed.

In the accompanying drawings, Figure 1 is a side elevation of a cultivator-plow provided with my improved fender attachment. Fig. 2 is a detail perspective view of the clip which connects the attachment to the plow-beam. Fig. 3 is a detail perspective view of the sectional bar which carries the fender blade and disk. Fig. 4 is a detail perspective view of the longitudinally-movable adjusting-bar. Fig. 5 is a detail perspective view of the clip adapted to be attached to one of the plow-handles and the guide-bar connected to the clip. Fig. 6 is a detail elevation showing the guide-bar and adjusting-bar disposed on the upper side of one of the plow-handles.

In the embodiment of my invention I provide a bar 1, to which is attached a fender blade or wing 2, which depends therefrom, and a revoluble fender-disk 3, which is disposed immediately in rear of the fender-wing 2. The said disk 3 revolves on a bolt 4. The fender-wing 2 is secured to the bar 1 by bolts
5. Said bolts 4 and 5 also secure a bar 6 in place, said bars 1 and 6 being on opposite sides of the wing 2 and disk 3. To the front end of the bar 1 is pivotally bolted a link 7, which is formed with an eye 8 at its front end.
A clip 9 is adapted to be clamped to the beam of the plow by the bolts 10. One member 11 of the clip passes through the eye 8, and thereby the link 7 is attached to the clip 9, and hence to the plow-beam. In practice the fender wing and disk are disposed about opposite the plow shovel or point.

To the rear end of the bar 1 is pivotally connected the adjusting-link 12 by means of the bolt 4. The upper end of the said link is here shown as provided with an eye 13 engaged by a ring or other suitably shaped link member 14.

An inverted-U-shaped clip 15 is adapted to be attached to one of the plow-handles and to lie astride of the same. The bolt 16, with which said clip is provided, adapts the latter to be clamped securely to the plow-handle, and the lower ends of the arms of said clip are extended and provided with adjusting-slots 17. A guide-bar 18 has its upper end attached by a bolt or screw to the plow-handle and is provided at its lower end with an adjusting-slot 19, which is curved and which registers with one of the adjusting-slots 17 of the clip 15. A bolt in said registering slots secures the lower end of the guide-bar to the clip 15, as will be understood. Said guide-bar is provided on its outer side, at its front and rear ends, with guide ways or bands 20 21. The latter is here shown as having a bolt or other suitable stop 22 at its lower side. A spring 23 is secured to the upper side of the guide-bar either as at 24 or in any other suitable manner.

A longitudinally-movable adjusting-bar 25 is carried by the guide-bar and operates in the guideways 20 21 thereof. The front end of the adjusting-bar 25 is formed with an eye 26, which is engaged by the link-ring 14. At the rear end of said adjusting-bar is a handle 27, by means of which it may be adjusted. On the under side of said adjusting-bar are a series of adjusting-notches 28, which are adapted to engage the stop-bolt 22. The spring 23 presses downwardly on said adjusting-bar to keep one of the notches 28 thereof in engagement with the stop-bolt to lock the adjusting-bar in its adjusted position. It will be understood that the rear end of the adjusting-bar may be raised against the resistance of the spring 23 sufficiently to disengage the stop-bolt 22 and permit readjustment of the adjusting-bar. It will also be understood that by moving the adjusting-bar endwise in the appropriate direction the bar 1, carrying the fender wing and disk, may be raised or lowered to adjust the fender wing and disk.

In operation the bar 1 is adjusted so that the fender-wing operates just above the level of the soil between the rows, while the disk is partially buried in the soil and prevents lateral displacement of the fender attachment, as will be understood. The function of my improved fender attachment is to prevent the plants which are being cultivated from being buried in whole or in part by the earth thrown up by the cultivating-plow.

By the use of my improved fender attachment the plow may be run very close to the rows of plants, with the fenders next to the row, to enable the soil close to the rows to be thoroughly and as deeply stirred as may be desirable. My fender attachment is also useful when cultivating hillsides.

When it is not necessary to use the fender attachment, the same may be raised and locked in an elevated position out of the way by drawing the adjusting-bar 25 rearwardly.

In Fig. 1 of the drawings the parts 15 and 18, and hence the adjusting-bar 25, are shown on the outer side of one of the plow-handles; but the same may be disposed on the upper side of the handle, as shown in Fig. 6, to cause the clip 15 and the front end of the guide-bar 18 to project laterally from the plow-handle, as may be required by the construction and proportion of the parts of the plow on which my fender attachment is used. The lower front portion of the adjusting-bar 25 is twisted or turned to lie at right angles to the rear portion thereof, and thus cause the eyes 13 26 to lie in a common plane. Set-pins, bolts, or studs may be appropriately placed in the openings 29, with which the bar 25 is provided, to limit the play or longitudinal movement of the adjusting-bar, as will be understood.

Having thus described my invention, I claim—

1. In a plow-fender of the class described, a fender-wing, a revoluble fender-disk in rear thereof and extending below the same and means to carry said wing and disk, substantially as described.

2. In a plow-fender of the class described, the combination of a bar, a fender carried thereby, means to connect the bar to a plow-beam, a guide-bar having means whereby it may be attached to a plow-handle, a longitudinally-adjustable bar carried by said guide-bar and connections between said adjustable bar and the bar which carries the fender, whereby the latter may be adjusted, substantially as described.

3. In a plow-fender of the class described, the combination of a link and means to attach the same to a plow-beam, a bar carrying a fender element having its front end pivotally connected to the link, a guide-bar having means whereby its rear end may be attached to a plow-handle, a clip to engage said handle, means to adjustably secure the front end of the guide-bar to said clip, a longitudinally-movable adjusting-bar carried by said guide-bar and a connection between said adjusting-bar and the rear end of the fender-carrying bar, substantially as described.

4. In combination with a fender adapted to be raised and lowered, a guide, a longitudinally-movable adjusting-bar carried by the guide and connected to the fender, a fixed stop, coacting adjusting elements with which the adjusting-bar is provided to engage said stop and a spring bearing on said adjusting-bar to normally lock the latter to the stop, substantially as described.

In testimony that I claim the foregoing as my own I have hereto affixed my signature in the presence of two witnesses.

JOHN W. BATES.

Witnesses:
 WILLIAM A. DOBBINS,
 HIRAM A. LOVELADY.